Dec. 23, 1941.    O. J. MARTINSON    2,267,614
DRAGLINE EXCAVATOR
Filed March 30, 1939    9 Sheets-Sheet 2

Inventor
Oscar J. Martinson

Dec. 23, 1941.  O. J. MARTINSON  2,267,614
DRAGLINE EXCAVATOR
Filed March 30, 1939   9 Sheets-Sheet 4

Dec. 23, 1941.  O. J. MARTINSON  2,267,614
DRAGLINE EXCAVATOR
Filed March 30, 1939  9 Sheets-Sheet 5

Fig. 5

Inventor
Oscar J. Martinson
Rummler, Rummler
+ Woodworth, Attys.

Dec. 23, 1941.  O. J. MARTINSON  2,267,614
DRAGLINE EXCAVATOR
Filed March 30, 1939   9 Sheets-Sheet 7

Inventor
Oscar J. Martinson
Rummler, Rummler
+ Woodworth Attys.

Dec. 23, 1941.   O. J. MARTINSON   2,267,614
DRAGLINE EXCAVATOR
Filed March 30, 1939   9 Sheets-Sheet 9

Inventor
Oscar J. Martinson

Patented Dec. 23, 1941

2,267,614

UNITED STATES PATENT OFFICE 2,267,614

DRAGLINE EXCAVATOR

Oscar J. Martinson, Chicago, Ill., assignor to Bucyrus-Monighan Company, Chicago, Ill., a corporation of Illinois Application March 30, 1939, Serial No. 264,955

3 Claims. (Cl. 37—116)

The improvements in drag line excavators herein presented are an outgrowth of an invention described in my prior Patent 2,214,026.

The invention referred to provides a way of extending the reach, or sphere of action, of a drag line excavating machine. In that case the drag or loading line, as usual, is used for both loading and unloading the bucket.

In the improvement herein disclosed, an arrangement is provided wherein the drag line is relieved of the necessity of controlling the unloading of buckets. The unloading operation is taken care of by the operation of a new arrangement of bucket suspension means with the attendant advantage of no need for maintaining tension on the drag line to prevent the bucket from dumping while it is hoisted and transported to the unloading position. The tension on the drag line, while hoisting, adds so greatly to the work of hoisting that without such tension the useful working capacity of a given machine may be largely increased.

One of the objects of the invention is to effect the saving mentioned. With a given boom strength, the buckets may be heavier or larger and have an increased load-carrying capacity. Incidentally, with the new arrangement, there is a large time-saving because the buckets may be instantly hoisted when filled. Substantial reductions in power requirements for drag line excavators are also brought about by the improvement. Also, with the improvement the bucket may be tipped back more than usual and hence retains and carries the load better. The shape of the bucket is modified accordingly to take a greater load.

The equipment now almost universally employed in drag line work involves the use of a diagonally set boom from the upper end of which is suspended, by means of a hoist line, the digging bucket. A drag or loading line extends from the bucket to the machine platform upon which the boom is mounted. The drag line is so connected with the bucket that such line may not only cause the bucket to be filled as the line is wound in by a winding drum on the machine platform, but also due to maintaining brake tension when the line is payed out, prevents the bucket from unloading while it is being hoisted, and transported to the dumping position by swinging the machine. Thus while a filled bucket is being hoisted, the hoisting requirements of the machine greatly exceed that required for vertical lift of the load because of the laterally applied force from the tensioned drag line.

The needed tension on the drag line required for maintaining a filled bucket upright in the load-carrying position, and produced by a brake puts a heavy strain on the boom, as the full load is then suspended with the hoist line often at an extreme angle, extending inwardly from the end of the boom. This angularity of suspension acts to excessively increase the hoist load.

In a two-line excavator where a weight is lifted by two flexible cables at an angle to each other, the weight being raised by widening the angle, that is, bringing the lines toward alignment, there is involved an amount of power far more than is necessary in raising the weight by vertical lift. The power consumed becomes increasingly greater as the lines approach alignment, and breakage would occur before that exact position is reached.

Because of the condition mentioned, which is almost universal with drag line excavators, the major power requirements of two-line excavators are in lifting the load and swinging the machine. The machine is working against brake power applied to the drag line drum. The operating elements of the machine are subjected to an undue strain, and it is therefore necessary to provide booms of greater strength than that needed for lifting the weight of the load. The invention therefore involves economy of structure and a saving of brake power and resistance by permitting such power to be usefully employed in the lift of a greater load.

Some of the disadvantages mentioned in connection with the standard two-line excavators now generally in use were not present in earlier types of drag line excavators which employed an additional hoist line, but then again the operation of such machines involved complications requiring excessive attention by the operator, with the consequence that the three-line arrangement was superseded by the two-line rig.

Another purpose of the invention, therefore, is to provide an improved three-line rig. This three-line rig has semi-automatic features designed for saving the time and attention of operators. Additionally, the improvement has the incidental features of ease and accuracy in dumping under the end or beyond the end of the boom, permitting the use of larger buckets and reducing the operating time, and permitting the successful use of an unusually long boom.

The invention is illustrated by the accompanying drawings, in which.

Some of the general features of the machine shown in the drawings are standard and well known in drag line excavation work. Such machines have a supporting base upon which a machinery supporting platform known as a revolving frame is mounted for swinging on a vertical axis. This swinging frame carries a mast for aid in supporting a diagonally extending boom. The boom is counterbalanced by weight on the revolving frame and is stayed to the mast. From the outer end of the boom an excavating bucket is suspended by means of a hoist line. The hoist line leads from the bucket around a sheave at the end of the boom to a winding drum on the machine platform. A drag line is attached to the forward end of the bucket from which it extends through fairleaders at the base of the boom to another winding drum on the machine platform.

The improvement on such standard construction requires changes as follows:

First, a rearrangement of the attachment points on the bucket whereby the hoist line trunnions are so placed as to be forward of the center of gravity of a loaded bucket, that is closer to its teeth than customary, but rearward of the center of gravity of the bucket when empty in the dumped position. The hoist line takes the weight of the bucket and its load but there is a resistance line attached to the rear end of the bucket which also passes over a sheave at the outer end of the boom, and like the hoist line, leads to a winding drum on the machinery platform. This winding drum, however, is not driven by power in the sense of the hoist drum, but unwinds by the weight of the bucket and is counterweighted so as to automatically rotate in a winding direction when the hoist line lifts the bucket. This counterweight is insufficient to hold the bucket suspended by the resistance line alone. The counterweighted drum is provided with a brake capable of adding resistance to rotation of the drum up to a definite limit, not sufficient with the aid of the counterweight to hold the bucket in suspension, but sufficient to cause the bucket to dump when the hoist line is partly relieved of its tension.

A second feature of the invention is that the dragline is not used for dumping the bucket. That operation is taken care of by a limited paying out of the hoist line while maintaining brake resistance to the counterweighted line.

A third feature of the invention is a coordination of the particular bucket rig specified with a boom extension, which boom extension adds to the reach of the machine but does not share with the main boom the strains to which the latter is subjected from handling a loaded bucket.

Due to the complex nature and size of drag line excavators the drawings diagrammatically indicate only the principal features of the class of machines to which the invention relates in connection with details of the new arrangement of bucket and control means.

In Figs. 1 to 6 the ground base 1 of the machine is shown as supporting a rotatable machine platform or frame 2. A mast 3 is mounted upon the frame and aids in supporting a boom 4 by means of suspension cables 5. The boom extends at an angle from the platform 2, where the lower inner end of the boom rests in a bearing. The machinery platform supports a hoist line drum 6, a resistance line drum 7, and a drag line drum 8. The drag line 9 leads from the drum 8 between fairleaders 10 and 11 to a chain bail attached to the forward end of the bucket. A short section of cable 9' leads from the drag line 9 around a block 12 to an attachment point 13 at the hood or upper forward end of the bucket 14, Fig. 9. The loading bail chain 15 forms an extension of the drag line and is attached to the forward end of the bucket at its sides, as indicated at 16.

Figure 9:
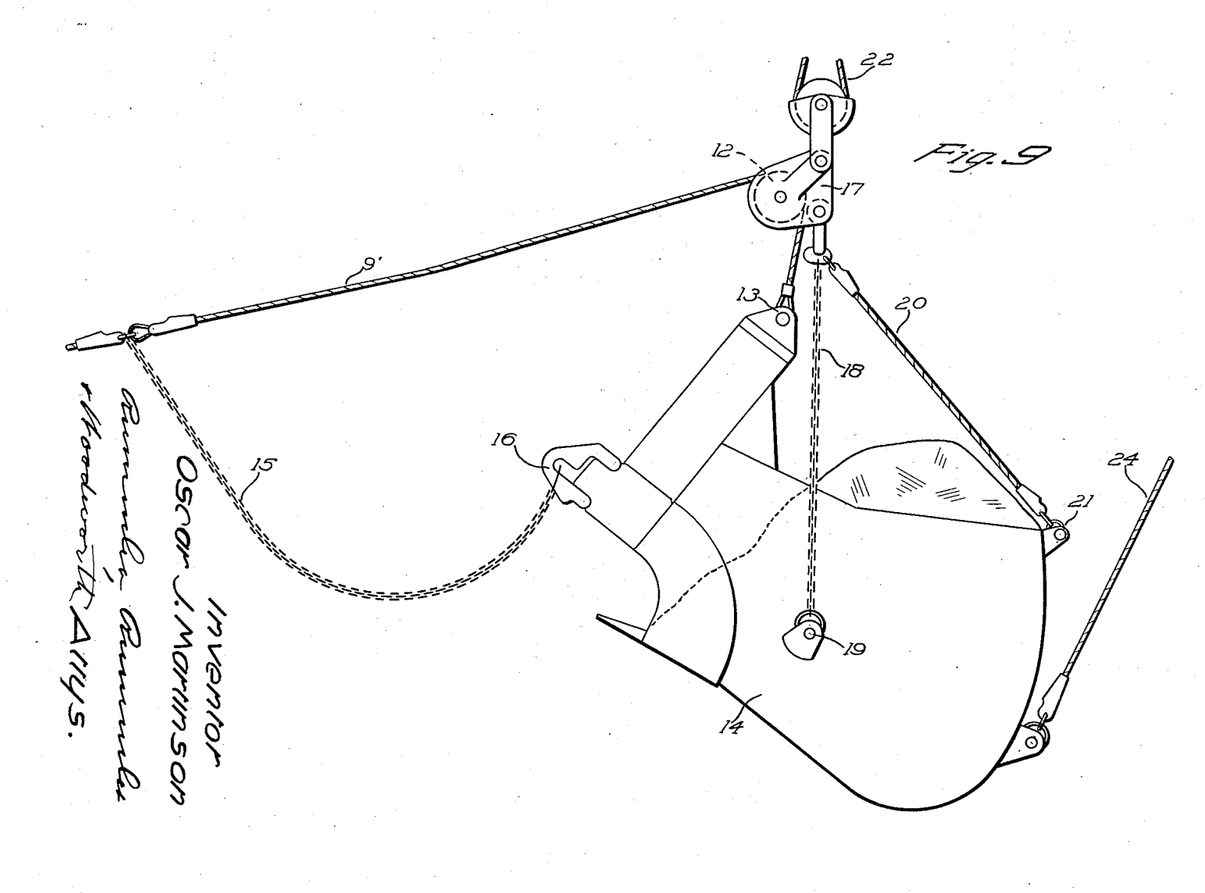
Fig. 9 is a side elevation of the improved bucket suspension means.

The shell 17 of block 12, as shown in Fig. 9, forms a connecting means between hoist bail chains 18 and other related cables. The lower ends of the chains 18 are attached to trunnions 19 located on the sides of the bucket, slightly forward of the center of gravity of the bucket when loaded. The bucket is supported upright against a tendency toward backward tilting by a check line 20 leading from an attachment point 21 at the rear of the bucket to the shell 17. A hoist line 22 leads from the shell 17 to a sheave 23 located at the end of the boom 4, and from there to the hoist drum 6.

Figure 1:
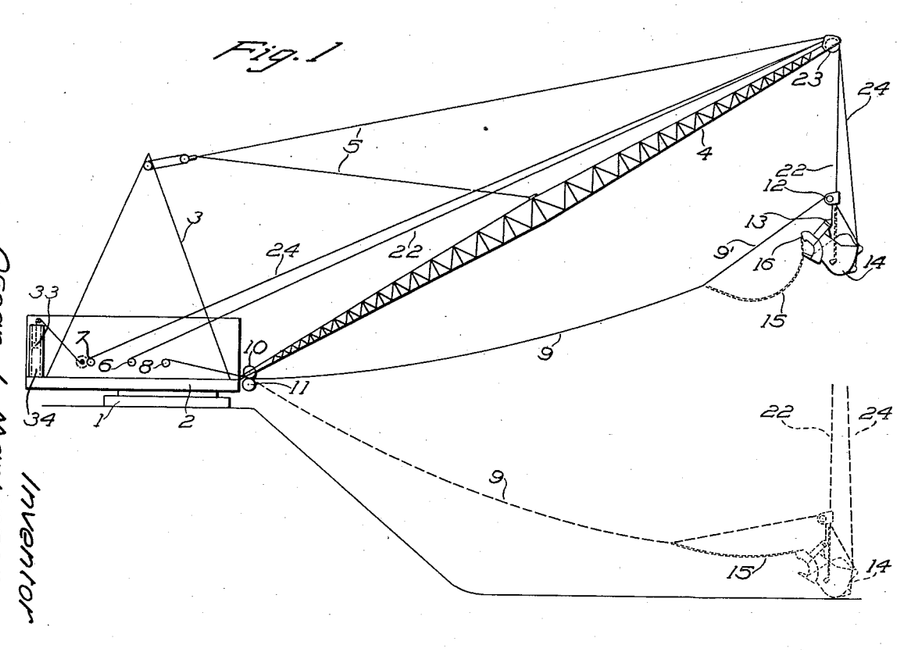
Figure 1 is a diagrammatic side elevation of a standard type excavator embodying the improvements.

In the arrangement shown in Fig. 1 a supplementary control or resistance line 24 leads from the rear of the bucket to another sheave at the end of the boom 4, and from there to a counterweighted winding drum 7.

As illustrated in Figs. 2 to 6 inclusive, the resistance line 24 leads from the rear of the bucket to a sheave 25 located at the end of an extension boom 26, and from there back to the counterweighted drum 7. The extension boom 26 is pivoted to the end of the main boom at 27, and is stayed in a similar manner by a cable 5' leading from the outer end of the extension boom to the mast 3.

Figure 10:
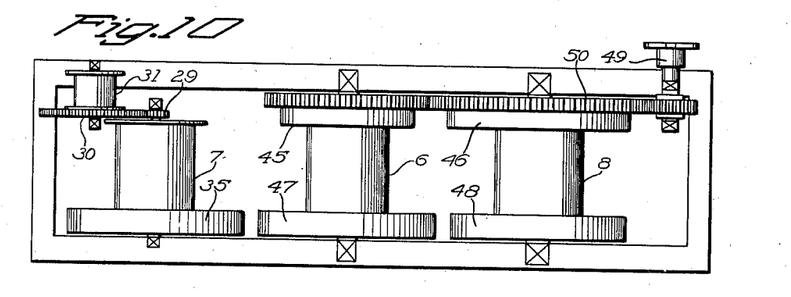
Fig. 10 is a plan view of the winding drums.

Drums 6 and 8, which respectively serve the hoist line 22 and the drag line 9, are power driven, as is customary in this art (Fig. 10).

Each of these drums is also, as usual, provided with clutches and brakes. Drum 7, however, is not connected for power operation, as is customary for drag and hoist lines. The operating and braking arrangement for this drum is illustrated by Fig. 7.

The drum 7 is normally freely rotatable on its shaft 28 but carries fast a pinion 29 meshing with a gear 30. The gear 30 is rigid with a small drum 31, to which is anchored a cable 32. The cable 32 leads to a counterweight 33, Figs. 1 to 6. The counterweight is suspended in a cylinder 34. The counterweight is of sufficient weight and the gear ratio is such as to permit the counterweight to keep slack out of resistance cable 24, but insufficient to support the weight of an empty bucket.

Figures 7, 8:
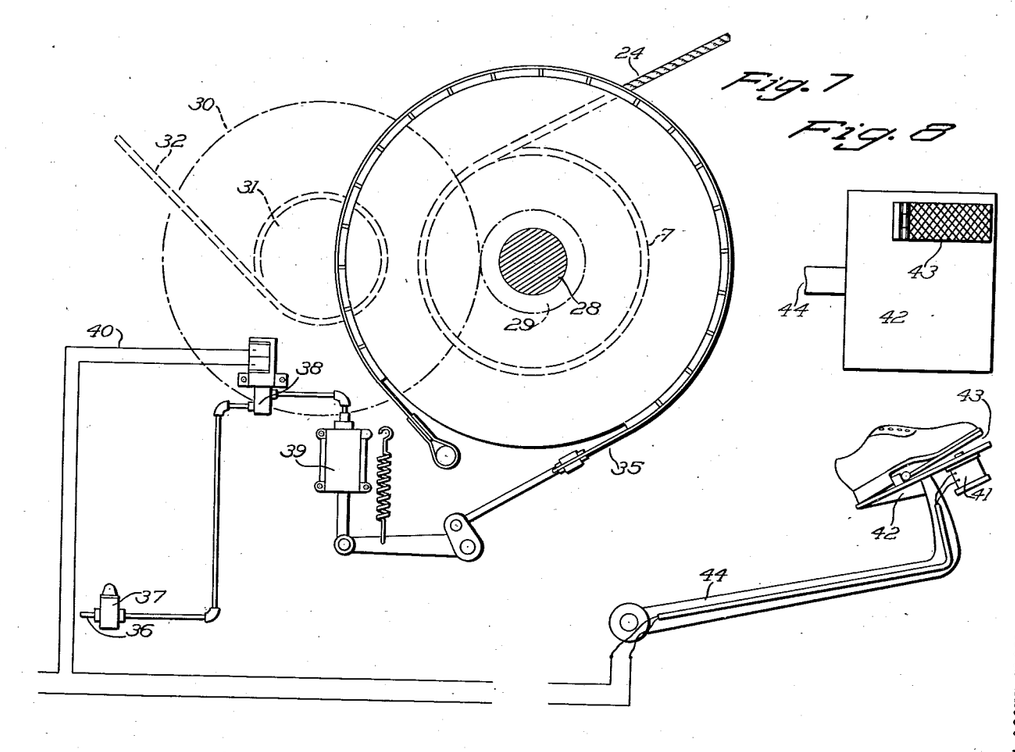
Fig. 7 is a side elevation of a pneumatically operated brake control for a resistance line drum and shows a counterweighted gear connection to the drum.
Fig. 8 is a fragmentary plan view of the hoist drum brake pedal.

Braking means are provided for drum 7, as illustrated in Fig. 7, and this braking means is so set that the maximum braking force which it may apply to the drum is insufficient with the action of the counterweight to entirely overcome the weight of an empty bucket. However, it does apply enough resistance to downward movement of the bucket for the purpose of enabling the bucket to dump when the hoist line 22 is paid out partly for that purpose.

The air supply for brake 35, Fig. 7, comes from a conduit 36 through an adjustable reducing valve 37. A magnetically operated valve 38 admits the air to a brake actuating cylinder 39. The control circuit 40 for valve 38 leads to a switch 41 mounted on the lower side of a hoist drum brake operating pedal 42. A switch operating pedal 43 is pivoted to pedal 42. Thus, whenever pedal 43 is depressed, the switch 41 closes circuit 40 and the magnetically operated valve 38 opens to allow air into the brake actuating cylinder 39. The brake then adds a measured resistance on drum 7, as determined by the setting of the reducing valve 37.

Pedal 42, Fig. 7, is rigid with the hoist line drum brake lever 44. As customary in drag line excavators, the hoist drum brake is normally off so as not to interfere with the driving of the drum when the bucket and load are hoisted.

Figure 6:
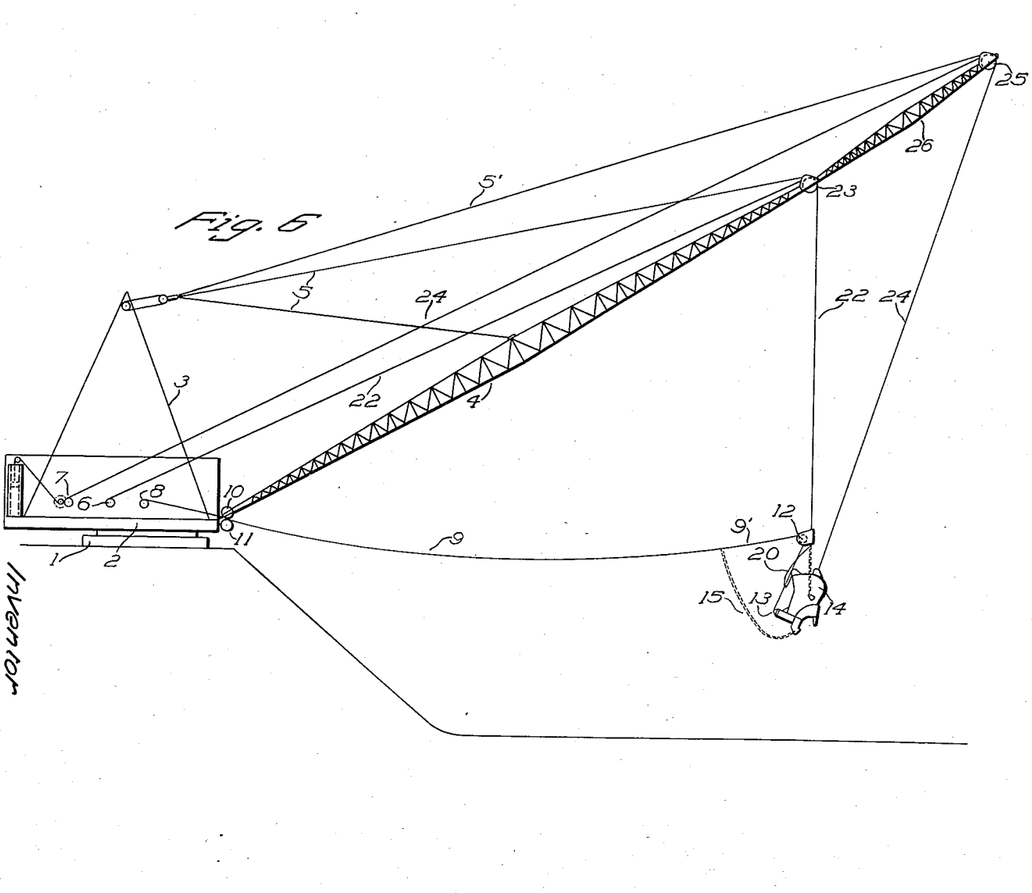

Fig. 8 shows that pedal 42 has enough area so that the operator may depress this pedal without affecting switch pedal 43; or by stepping on switch pedal 43 hard enough, not only closes the switch but also depresses hoist line brake arm 44. In that case the resistance drum brake 35 is applied in advance of applying hoist line brake, and in the reverse direction, the hoist line brake is released before release of the resistance line brake 35. That manner of operation is employed for the purpose of dumping the bucket. The maximum resistance is placed upon line 24, while hoist line 22 is allowed to pay out sufficiently to dump the bucket. The bucket will move downward unless checked by reapplying the brake for the hoist line drum. The bucket then hangs, as indicated in Fig. 6, with brake power on line 22 and off line 24. The counterweight, however, serves to keep slack out of line 24.

Fig. 10 indicates clutches 45 and 46 and brakes 47 and 48 respectively for the hoist drum 6 and the drag line drum 8. This view also shows a power shaft 49 and gearing 50 for driving drums 6 and 8.

Figure 11:
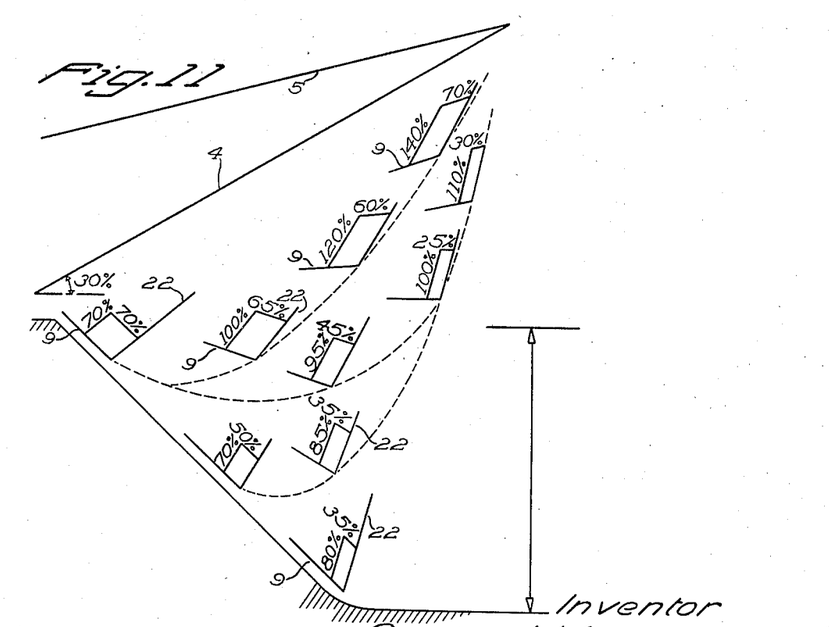
Fig. 11 illustrates the high brake efforts required for prior and customary drag line equipment and which are saved by the improvement.

The brake effort diagram of Fig. 11 illustrates the excessive power requirements normal with standard drag line excavators for hoisting the bucket and keeping it from dumping through suspension of the load by two tensioned lines at various angles. This is avoided with the improved construction by leaving the drag line slack and hoisting the loaded bucket by a straight pull on the hoist line from any ground position of the bucket as soon as filled.

Different angular relationships between the drag line 9 and the hoist line 22 are illustrated in the diagram. When these lines are at substantially the 90° angle, as illustrated at the left of the figure, each line takes approximately a strain of 70% of the entire load. Adding these figures together gives 144%. There is, therefore, a condition requiring substantially 44% excess strain on the equipment due to the tension on the drag line. When the angle between the lines widens to the extent indicated at the upper right-hand corner of the figure, the two percentages, 140% and 70% added together amount to 210%. If the angle between the two lines is still further widened, the holding power requirements would rise enormously and rapidly reach the break-down point. It is believed that the condition there represented of holding the bucket from dumping by means of these angularly related tension lines should be departed from, if possible, and hence the present improvements are proposed.

Figure 2:
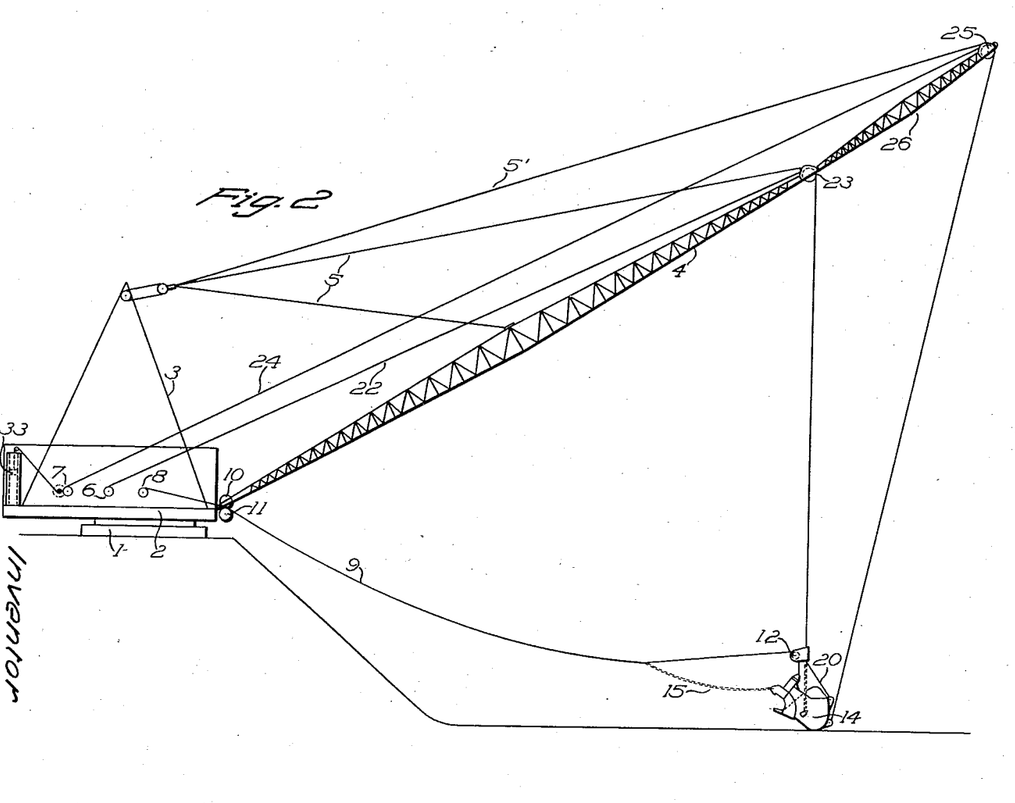
Figs. 2 to 6 are side elevations of the same construction with an extended boom, showing the new equipment in various successive positions of an operating cycle.

A cycle of operation of the machine is illustrated by Figs. 2 to 6. Fig. 2 shows a loaded bucket at the start of the hoisting operation. Line 22 is taking the load. Drag line 9 is slack and the resistance line 24 is free from slack due to the action of counterweight 33. The same condition of the lines still exists when the bucket has reached its upper position as in Fig. 3. The machine is swung to the unloading position while the bucket is being hauled up. Check line 20 is taut when the bucket is supporting a load as in Figs. 2 and 3, due to the fact that the center of gravity of the loaded bucket is slightly to the rear of the bucket trunnions for the hoist line chain bail.

Figure 4:
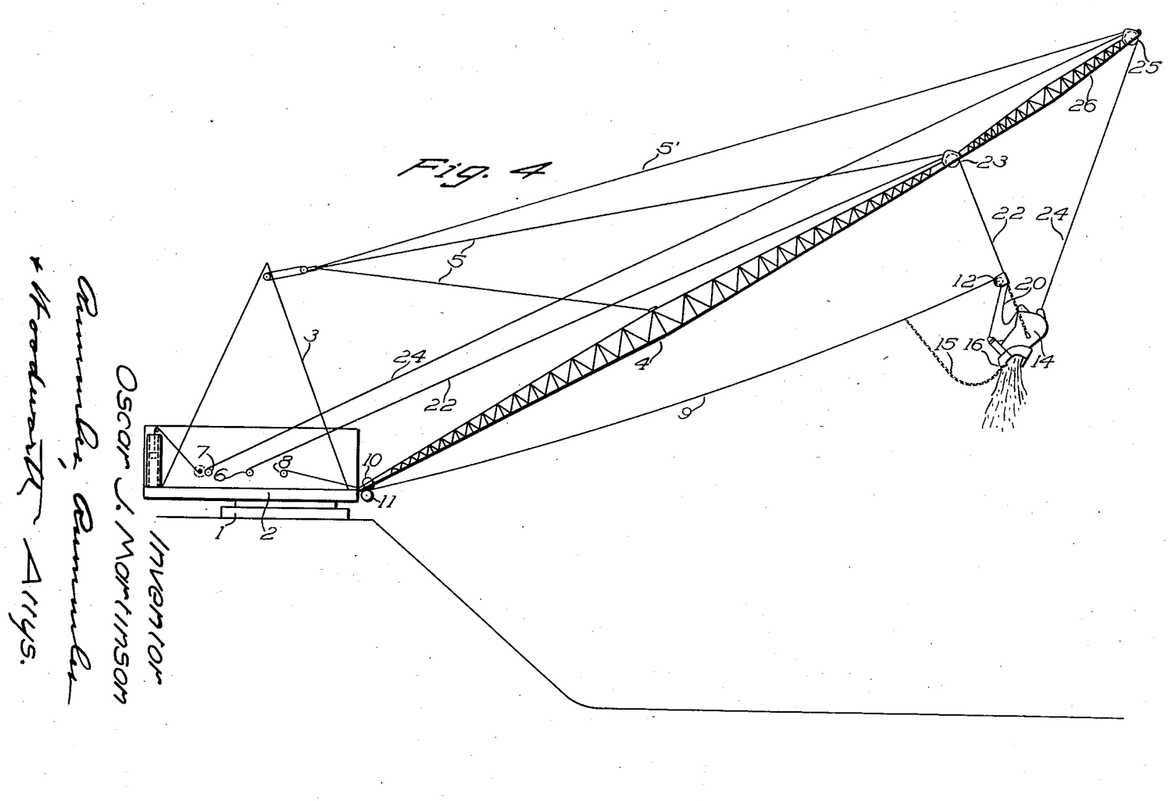

Fig. 4 illustrates the bucket releasing its load. Under such conditions the brake for hoist line drum 6 is released while such braking power as is provided for the drum 7 of resistance line 24 is made use of. The attachment point of line 24 to the bucket is at that time the pivot point upon which the bucket turns. The weight of the unloaded bucket is sufficient to overcome the counterweight and brake resistance on line 24 and the bucket will move down after unloading and while the machine is being swung back to position for another working stroke. If it is desired to retard or stop the downward movement of the bucket, brake for hoisting drum 6 is more or less reapplied.

Figure 5:
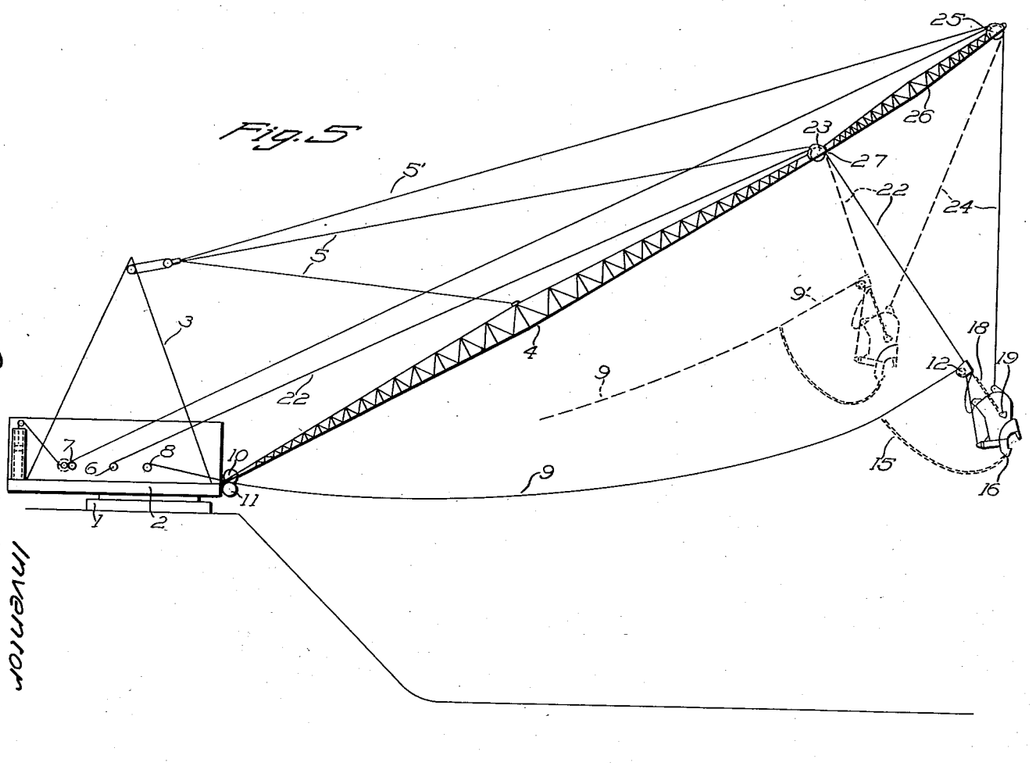

Fig. 5 illustrates the action of returning the bucket to the pit and how that action may be modified. In the broken line position of the bucket the hoist line is held under greater tension relative to the full line position. In the full line position the braking of hoist drum 6 is minimum, while the maximum resistance is applied to line 24. This causes the bucket to swing outwardly from the sheave 25 while it is lowered to the ground. The broken lines indicate the positon of the bucket when both lines may reeve out. This causes the bucket to reach the ground at some point between the end of the main boom and the end of the extension boom, and that depends upon a differential use of the brakes for drums 6 and 7.

Fig. 6 shows the bucket being lowered with the brake for resistance line drum 7 off. The bucket is then lowered to a point beneath sheave 23 on the main boom 4.

The portion 9' of drag line 9 is ordinarily termed a dump line. The normal functioning of 9' in preventing a loaded bucket from dumping is brought about in prior drag line excavators by tension on the drag line, but that function of line 9' is here dispensed with and the connection is unnecessary except in cases where it is desired to assist the bucket to break loose from the material operated upon, such as sticky clay by momentarily tensioning the drag line while the hoist line lifts the loaded bucket clear. Another instance where this line 9' may be employed is when the filled bucket is lifted at a point close to the machine and it then prevents the hoist line from pulling the bucket partly away from its load due to the extreme angle at which the hoist line sets at that time. In the normal operation of the machine the connecting line 9' is not used, and the bucket is hoisted as soon as filled. There is no longer need for causing the bucket to execute a full stroke toward the machine.

The raised bucket 14 can be cast beyond the end of the boom 26 in the case of the extended boom construction, by braking the supplementary drum 7 and permitting the main hoist line 22 to unwind as the bucket 14 swings outwardly and downwardly by its own weight. Additional impetus may be given the bucket 14, of course, by drawing the raised bucket 14 toward the base 1 before releasing the drag and hoist lines. In this way, provided sufficient tension is maintained on the hoist line 22 to prevent unloading until desired, a loaded bucket may be operated to scatter the load in an area beneath the end of the main boom and the end of the extension boom.

Casting and dumping with the non-extension boom construction of Fig. 1 is similarly accomplished.

Figure 3:
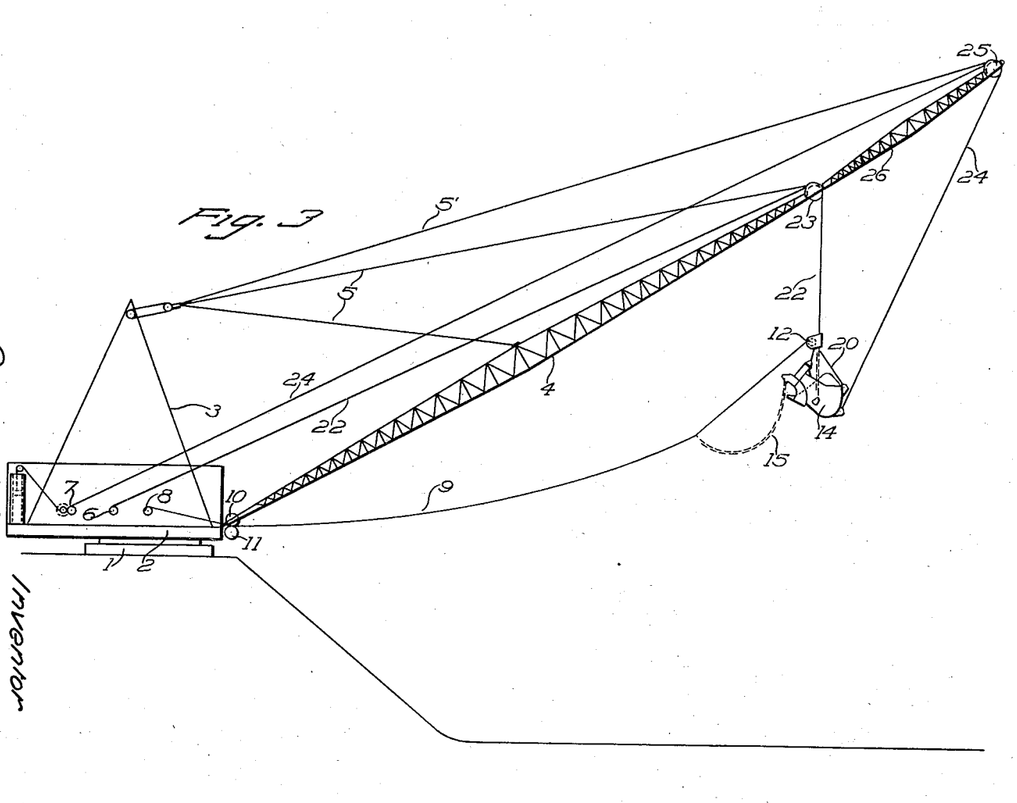

The bucket must always be raised and lowered with the hoist line 22. The resistance line 24 cannot perform the function of raising and lowering the bucket. The sole purpose of the resistance line 24 is to bring into effect an upsetting moment by applying resistance to downward motion of the bucket rearwardly of the hoist line bale chain attachment points to the bucket. The bucket is supported in the load-carrying position, as indicated in Fig. 3, by the hoist line 22 with the aid of check line 20 which lines lead to the bucket at opposite sides of its center of gravity, but by adding resistance to downward travel of the bucket by means of the line 24 the bucket is rotated to the left enough to cause the center of gravity to pass through the dead center. When the center of gravity of the bucket moves forward of line 22, that is, toward the machine base, the load is promptly released and the bucket hangs with its mouth down as indicated by Fig. 6. Thus, when the bucket descends by paying out hoist line 22, the teeth of the bucket penetrate the soil surface.

The rigging as described enables the operator to hold a filled bucket suspended by line 22, while the machine swings to the unloading position, merely by holding down brake lever 44, Fig. 7. The brake for drum 6 is thus held applied and incidentally contact operating pedal 43 is held depressed which results in a limited resistance being added to drum 7, Fig 3. Such added resistance is not used until the load is to be released, when brake lever 44 is allowed to come up and let the hoist drum 6 rotate under the pull of the load. The operator's foot will still be on treadle 43 and hence the resistance on line 24 becomes effective for causing the bucket to turn on its pivotal connection with the hoist line and release the load. Any further turning of the bucket is effected by gravity, since the work performed by line 24 is merely to rock the bucket far enough to cause its center of gravity to shift from the rear to forward of line 22.

The center of gravity of the bucket when in upright or load-carrying position, as illustrated in Fig. 8, is always to the right of trunnions 19 irrespective of whether it carries a load or not. When in dumped position, that is with its teeth and open mouth facing downwardly, the center of gravity is to the left of the hoist line bale chain.

I claim:

1. A drag line excavator having a base with a boom extending diagonally upward therefrom, three winding drums on said base, a sheave at the outer end of the boom, a bucket, a hoist line extending from said bucket over the sheave and to one of said winding drums, a drag line connecting the bucket with another of said winding drums, a second sheave at the outer end of the boom, a resistance line extending from the bucket over said sheave and to the third winding drum, and counterbalancing means for said resistance line drum tending to cause said resistance line to be automatically wound upon upward travel of the bucket when the bucket is lifted by the hoist line.

2. A drag line excavator having a base with a boom extending diagonally upward therefrom, three winding drums on said base, a sheave at the outer end of the boom, a bucket, a hoist line extending from said bucket over the sheave and to one of said winding drums, a drag line connecting the bucket with another of said winding drums, a second sheave at the outer end of the boom, a resistance line extending from the bucket over said second sheave and to the third winding drum, counterbalancing means for said resistance line drum tending to cause said resistance line to be automatically wound upon upward travel of the bucket when the bucket is lifted by the hoist line, and ratio means for multiplying motion between said counterbalancing means and the resistance line winding drum.

3. A drag line excavator including a machinery supporting base, a bucket, a bucket suspension boom extending diagonally upward from the base, a hoist line extending from the machine base over the end of the boom to the bucket, a separate extension boom attached to the end of said first mentioned boom, a resistance line extending from the machine base over the end of the extension boom to the bucket, a drag line extending from the machine base to the bucket, and separate attachment means for each of said lines to the bucket located with reference to the center of gravity of the bucket when in load-carrying position whereby the drag line and hoist lines are located forwardly of the center of gravity and the resistance line is located rearwardly of the center of gravity and when in a dump position, the hoist line connection is rearward of the center of gravity.

OSCAR J. MARTINSON.